(12) United States Patent
Zhou et al.

(10) Patent No.: US 8,599,969 B2
(45) Date of Patent: Dec. 3, 2013

(54) COMMUNICATIONS CHANNEL ESTIMATION

(75) Inventors: Yan Zhou, San Diego, CA (US); Jibing Wang, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 998 days.

(21) Appl. No.: 12/540,574

(22) Filed: Aug. 13, 2009

(65) Prior Publication Data

US 2011/0038445 A1 Feb. 17, 2011

(51) Int. Cl.
*H04L 27/06* (2006.01)

(52) U.S. Cl.
USPC .................................................... 375/340

(58) Field of Classification Search
USPC .......... 375/316, 340, 341, 346, 324, 325, 326
See application file for complete search history.

(56) References Cited

U.S. PATENT DOCUMENTS

| | | | |
|---|---|---|---|
| 6,907,270 B1* | 6/2005 | Blanz | 455/562.1 |
| 7,778,605 B2* | 8/2010 | Hara | 455/63.1 |
| 2003/0125091 A1* | 7/2003 | Choi et al. | 455/562 |
| 2005/0141649 A1 | 6/2005 | Tanabe | |
| 2006/0227889 A1* | 10/2006 | Uchida et al. | 375/260 |
| 2007/0117527 A1* | 5/2007 | Xu et al. | 455/127.4 |

OTHER PUBLICATIONS

Chang Dong Lee et al: "Low-rank pilot-symbol-aided channel estimation for MIMO-OFDM systems" 2004 IEEE 60th Vehicular Technology Conference. VTC2004-Fall (IEEE CAT. N0.04CH37575) IEEE Piscataway, NJ, USA., vol. 1, Sep. 26, 2004, pp. 469-473, XP010788419 ISBN: 978-0-7803-8521-4.

Dietrich F et al: "On performance limits o f optimum reduced rank channel estimation" GLOBECOM'02. 2002—IEEE Global Telecommunications Conference. Conference Proceedings. Taipei, Taiwan, Nov. 17-21, 2002; [IEEE Global Telecommunications Conference], New York, NY : IEEE, US LNKDDO1 : 10.1109/GLOCOM. 2002.1188098, vol. 1, Nov. 17, 2002, pp. 345-349, XP010635970 ISBN: 978-0-7803-7632-8.

International Search Report and Written Opinion—PCT/US2010/043436, International Search Authority—European Patent Office—Nov. 5, 2010.

Ove Edfors et al: "OFDM Channel Estimation by Singul ar Value Decomposition" IEEE Transactions on Communications, IEEE Service Center, Piscataway, NJ, US LNKDDO1 : 10.1109/26.701321, vol. 46, No. 7, Jul. 1, 1998, pp. 931-939, XP011009204 ISSN: 0090-6778.

Wong Icetal: "Joint channel estimation and prediction for OFDM systems" Global Telecommunications Conference, 2005. GLOBECOM '05. IEEE St. Louis, MO, USA Nov.28-Dec. 2, 2005, Piscataway, NJ, USA IEEE LNKDDO1: 10.1109/GLOCOM. 2005. 1578065. vol. 4, Nov. 28, 2005, pp. 2255-2259, XP010879513 ISBN: 978-0-7803-9414-8.

(Continued)

*Primary Examiner* — Sam K Ahn
*Assistant Examiner* — Vineeta Panwalkar
(74) *Attorney, Agent, or Firm* — Mary A. Fales

(57) ABSTRACT

Techniques for estimating the response of a communications channel. In an aspect, a channel autocorrelation matrix is derived based on, e.g., certain assumptions about the time delay profile, Doppler profile. An eigenvector decomposition is performed on the autocorrelation matrix, and a set of dominant eigenvectors is determined. A received pilot signal vector is projected onto a projection matrix derived from the dominant eigenvectors to generate a set of eigen-coefficients, which is then used to reconstruct an estimated channel vector. In an exemplary embodiment, the eigenvector-based approach is combined with a simplified minimum mean-square error based approach to generate an estimated channel vector when the received signal-to-noise ratio is below a threshold.

18 Claims, 6 Drawing Sheets

(56) References Cited

OTHER PUBLICATIONS

Yiwen Zhang et al. "Subspace Projection-based OFDM Channel Estimation" Wireless Personal Communications, Kluwer Academic Publishers, DO, vol. 44, No. 4, Sep. 11, 2007, pp. 371-381, XP019582183 ISSN: 1572-834X.

Edfors O et al: "OFDM channel estimation by singular value decomposition" Vehicular Technology Conference, 1996. Mobile Technology for the Human Race., IEEE 46th Atlanta, GA, USA Apr. 28-May 1, 1996, New York, NY, USA, IEEE, US LNKD-DOI: 10.1 1091VETEC. 1996.501 446, vol. 2, Apr. 28, 1996, pp. 923-927.

Qin W et al: "Joint channel and phase noise estimation in OFDM using KL expansion" AEU International Journal of Electronics and Communications, Elsevier, Jena, DE LNKD-DOI: 10.1 01 61 J.AEUE. 2007.09.005, vol. 62, No. 10, Nov. 1, 2008, pp. 777-781, XP025519909 ISSN: 1434-8411 [retrieved on Oct. 22, 2007].

Taiwan Search Report—TW099126969—TIPO—May 22, 2013.

* cited by examiner

US 8,599,969 B2

COMMUNICATIONS CHANNEL ESTIMATION

TECHNICAL FIELD

The present invention relates generally to communications, and more specifically, to techniques for estimating the response of a communications channel.

BACKGROUND

Wireless communications systems are widely deployed to provide various types of communication such as voice, packet data, and so on. These systems may be based on code division multiple access (CDMA), time division multiple access (TDMA), orthogonal frequency division multiple access (OFDMA), or other multiple access techniques to allow multiple devices to share a common communications medium. Such systems can conform to standards such as Third-Generation Partnership Project 2 (3gpp2, or "cdma2000"), Third-Generation Partnership (3gpp, or "W-CDMA"), or Long Term Evolution ("LTE" or "LTE-A").

In such communications systems, it is oftentimes desired to estimate the frequency response of a communications channel (i.e., the "channel response") for use in equalization schemes to combat channel distortion at the receiver. Prior art techniques for estimating the channel response include extracting a pilot portion of a received signal having known frequency and content sent by the transmitter, and reconstructing the channel response by using the pilot tones to weight a set of discrete Fourier (harmonic) basis functions (i.e., discrete Fourier transform or DFT-based channel estimation). In practice, there may be an error floor when using DFT-based channel estimation due to the truncation of Fourier basis functions. An alternative technique is to apply a minimum mean square error (MMSE) criterion to estimate the coefficients of the channel response. However, such an approach may require continuous estimation of the signal-to-noise ratio (SNR) of the channel, which may be challenging when only a limited number of pilot observations is available.

It would be desirable to provide efficient and novel techniques for estimating the response of a communications channel.

SUMMARY

An aspect of the present disclosure provides a method for estimating a channel vector for a communications channel, the method comprising generating an eigen-based weight matrix based on a dominant eigenvector matrix derived from an autocorrelation matrix of a channel vector, the weight matrix comprising the product of a data selection matrix, the dominant eigenvector matrix, and the pseudo-inverse of a projection matrix, the projection matrix comprising the product of a transmit pilot matrix, a pilot selection matrix, and the dominant eigenvector matrix; and multiplying the eigen-based weight matrix with a received pilot vector to generate an estimated data channel vector.

Another aspect of the present disclosure provides an apparatus for estimating a channel vector for a communications channel, the apparatus comprising: a weight generation module configured to generate an eigen-based weight matrix, the weight matrix comprising the product of a data selection matrix, an eigenvector basis matrix, and the pseudo-inverse of a projection matrix, the projection matrix comprising the product of a pilot selection matrix and the eigenvector basis matrix, the eigenvector basis matrix comprising the dominant eigenvectors of an autocorrelation matrix of the channel vector; and a module configured to multiply the output of the weight generation module with a received signal vector to generate an estimated data channel vector.

Yet another aspect of the present disclosure provides an apparatus for estimating a channel vector for a communications channel, the apparatus comprising: means for generating an eigen-based weight matrix based on a dominant eigenvector matrix derived from an autocorrelation matrix of a channel vector; and means for multiplying the eigen-based weight matrix with a received pilot vector to generate an estimated data channel vector.

Yet another aspect of the present disclosure provides a computer program product storing code for causing a computer to estimate a channel vector for a communications channel, the code comprising: code for causing a computer to generate an eigen-based weight matrix based on a dominant eigenvector matrix derived from an autocorrelation matrix of a channel vector, the weight matrix comprising the product of a data selection matrix, the dominant eigenvector matrix, and the pseudo-inverse of a projection matrix, the projection matrix comprising the product of a transmit pilot matrix, a pilot selection matrix, and the dominant eigenvector matrix; code for causing a computer to multiply the eigen-based weight matrix with a received pilot vector to generate an estimated data channel vector.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Figure 1:
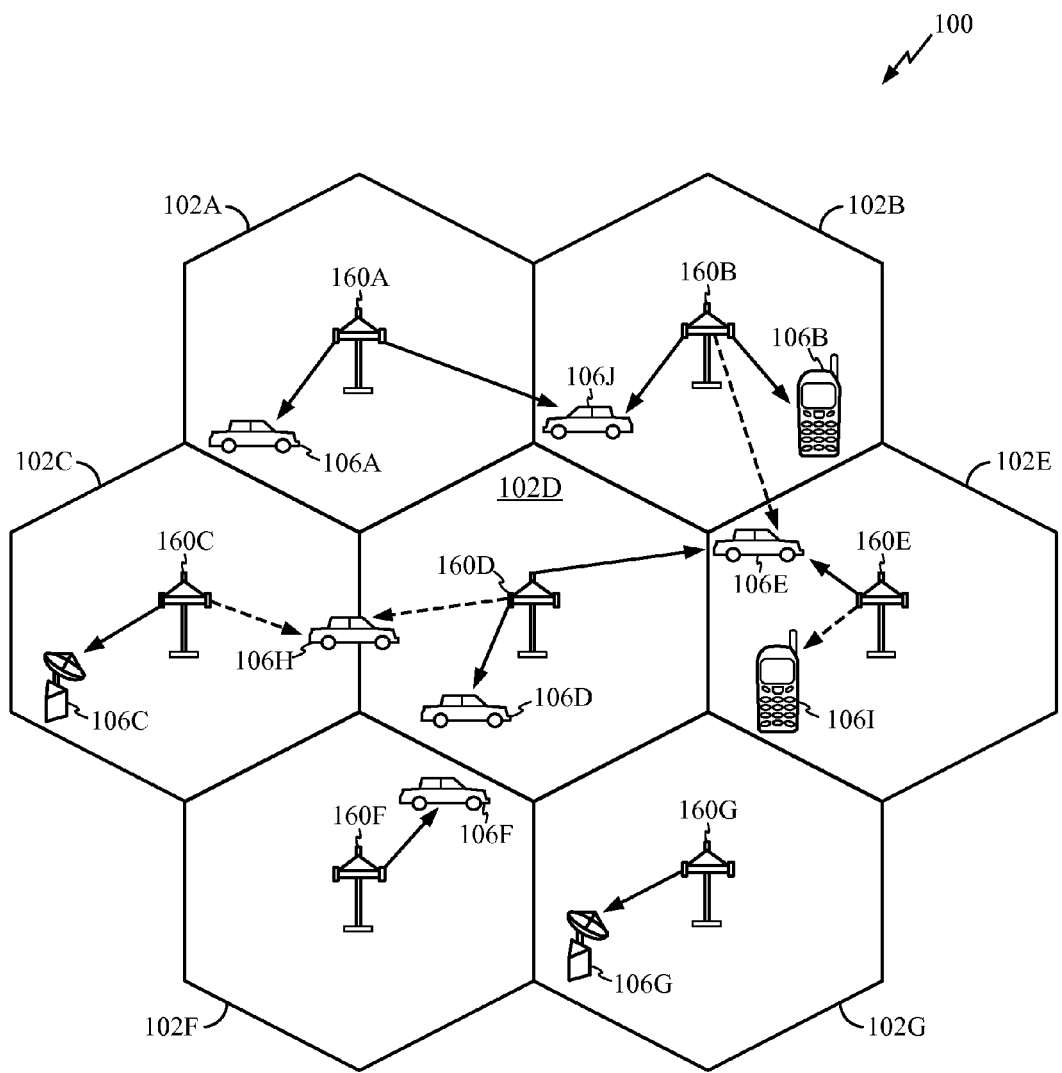
FIG. 1 illustrates a prior art wireless cellular communications system.

Referring to FIG. 1, in a wireless cellular communications system 100, reference numerals 102A to 102G refer to cells, reference numerals 160A to 160G refer to base stations (BS's), and reference numerals 106A to 106G refer to access terminals (AT's). A communications channel includes a forward link (FL) (also known as a downlink) for transmissions from a base station 160 to an access terminal (AT) 106 and a reverse link (RL) (also known as an uplink) for transmissions from an AT 106 to a base station 160. The AT 106 is also known as a remote station, a mobile station or a subscriber station. The access terminal (AT) 106 may be mobile or stationary. Each link may incorporate a different number of carrier frequencies. Furthermore, an access terminal 106 may be any data device that communicates through a wireless channel or through a wired channel, for example using fiber optic or coaxial cables. An access terminal 106 may further be any of a number of types of devices including but not limited to PC card, compact flash, external or internal modem, or wireless or wireline phone.

Modern communications systems are designed to allow multiple users to access a common communications medium. The multiple-access concept is a channel allocation methodology which allows multiple user access to a common communications link. The channel allocations can take on various forms depending on the specific multiple-access technique. Numerous multiple-access techniques are known in the art, such as time division multiple-access (TDMA), frequency division multiple-access (FDMA), space division multiple-access (SDMA), polarization division multiple-access, code division multiple-access (CDMA), orthogonal frequency division multiple access (OFDMA), and other similar multiple-access techniques. For example, in FDMA systems, the total frequency spectrum is divided into a number of smaller sub-bands and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a code.

In a communications system, information may be transmitted using any of numerous modulation techniques known in the art, including quadrature phase-shift keying (QPSK), quadrature amplitude modulation (QAM), etc. In a modulation technique known as orthogonal frequency division multiplexing (OFDM), data is modulated onto multiple orthogonal sub-carriers using a conventional modulation scheme, and recovered at the receiver on the basis of the orthogonality of the sub-carriers.

While certain exemplary embodiments of the present disclosure may be described hereinbelow in the context of OFDM, one of ordinary skill in the art will appreciate that the techniques may readily be applied to other digital communications systems, such as those based on other modulation techniques. Such alternative exemplary embodiments are contemplated to be within the scope of the present disclosure.

Figure 2:
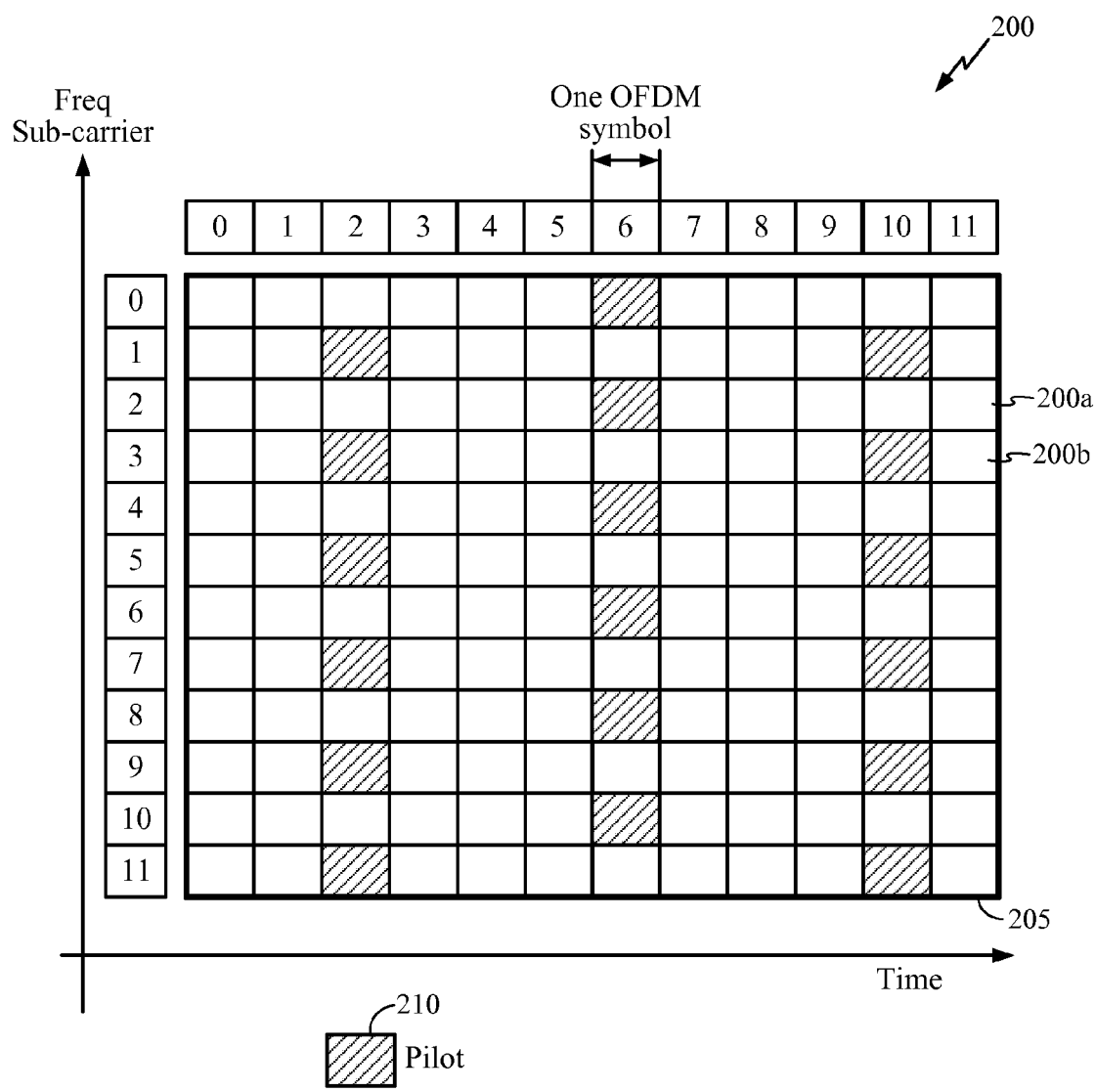
FIG. 2 illustrates an exemplary pilot grid pattern for a communications scheme based on OFDM.

FIG. 2 illustrates an exemplary time-frequency grid pattern 200 for a communications scheme based on OFDM. Note the grid pattern 200 is shown for illustrative purposes only, and is not meant to restrict the scope of the present disclosure to any particular grid pattern shown.

In FIG. 2, the horizontal time axis is divided in units of OFDM symbols, while the vertical frequency axis is divided amongst a plurality of orthogonal sub-carriers. An intersection between an OFDM symbol and an OFDM sub-carrier is designated as a "grid block," e.g., grid blocks 200a and 200b. In an exemplary embodiment, an OFDM symbol may span, e.g., 100 μsec, while OFDM sub-carriers may be separated from each other by a minimum spacing of, e.g., 10 kHz.

According to the present disclosure, an "assignment block" may include a block of $N_1$ OFDM symbols and $N_f$ sub-carriers. For example, 12 OFDM symbols and 12 sub-carriers are shown in an exemplary assignment block 205 in FIG. 2. An assignment block may be characterized by an $N_f \times N_t$ channel matrix H, wherein each element H(a,b) of the matrix H represents the channel coefficient corresponding to the a-th sub-carrier in the b-th OFDM symbol of the assignment block. For convenience, the matrix H can also be written as an $N_f N_t \times 1$ channel response vector (or "channel vector") h as follows:

$$\underline{h} = \begin{bmatrix} H(1: N_f, 1) \\ \vdots \\ H(1: N_f, Nt) \end{bmatrix};$$

(Eq. 1)

wherein the individual columns of H are "stacked" into a single column vector h.

It will be appreciated that certain of the grid blocks in an assignment block, e.g., the non-hatched grid blocks in the assignment block 205, may generally contain arbitrary data sent from the transmitter to the receiver. Other grid blocks, e.g., the diagonally hatched grid blocks 210, are designated as pilots. The pilots may correspond to grid blocks wherein pre-defined patterns known to the receiver are sent by the transmitter, e.g., to aid in channel estimation by the receiver. For the $N_p$ pilots of an assignment block (e.g., $N_p = 18$ for assignment block 205 in FIG. 2), an $N_p \times 1$ pilot channel vector $h_p$ can be formed by extracting the channel coefficients at the pilot positions from h by an $N_p \times N_f N_t$ pilot selection matrix P as follows:

$$h_p = Ph.$$ (Eq. 2)

It will be appreciated that the pilot selection matrix P will depend on the specific pilot pattern used in the communication system (e.g., a specific pilot pattern such as shown in FIG. 2 for assignment block 205), and thus, by appropriately selecting P, arbitrary pilot patterns may be accommodated in the channel estimation techniques to be described hereinbelow.

At the receiver, an $N_p \times 1$ received pilot vector z may be expressed as follows:

$$z = Sh_p + n;$$ (Eq. 3a)

$$= SPh + n;$$ (Eq. 3b)

wherein S is denoted the "transmit pilot matrix," and is an $N_p \times N_p$ diagonal matrix containing the pilot signals originally sent by the transmitter in the diagonal entries. n is a noise vector whose entries may be assumed to have equal power or variance $\sigma^2$.

One of ordinary skill in the art will appreciate that for the purpose of equalization in communications receivers, it is desirable to estimate the frequency response of the communications channel, or the channel response. Discussed further hereinbelow are eigenvector decomposition-based techniques for estimating the channel response of a received signal using the received pilots z.

To derive an eigenvector basis for z, define an autocorrelation matrix $R_{hh}$ of the channel vector h as follows:

$$R_{hh}=E[hh^H]  \quad\quad (Eq. 4)$$

In an exemplary embodiment, certain assumptions may be made about the autocorrelation matrix $R_{hh}$ so that the entries of $R_{hh}$ may be computed "off-line," i.e., prior to receiving any particular z over the communications channel.

Figure 3A:
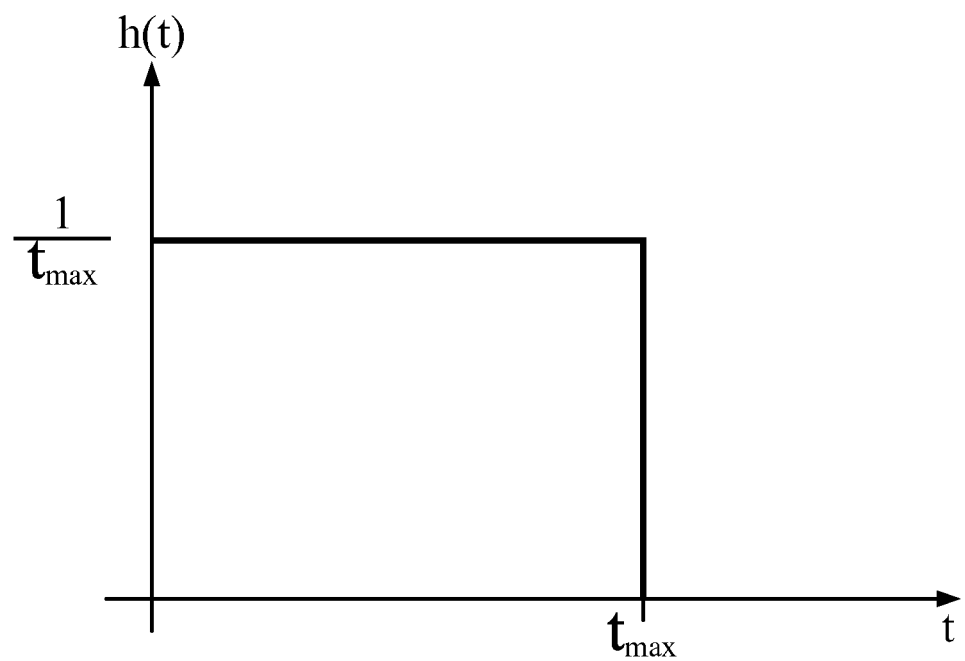
FIG. 3A illustrates an exemplary embodiment of an assumed time delay profile of the channel that may be used in the computation of $R_{hh}$.

FIG. 3A illustrates an exemplary embodiment of an assumed time delay profile of the channel that may be used in the off-line computation of $R_{hh}$. In FIG. 3A, the time impulse response h(t) of the channel is assumed to be rectangular up to a time $t_{max}$, as shown. In an exemplary embodiment, $t_{max}$ may be, e.g., 4 μsecs. It will be appreciated that the assumed time delay profile in FIG. 3A is given for illustrative purposes only, and is not meant to limit the scope of the present disclosure to any particular assumed time delay profile for the channel. In alternative exemplary embodiments, alternative values of $t_{max}$, and/or time delay profiles having shapes other than strictly rectangular, may be used. Such alternative exemplary embodiments are contemplated to be within the scope of the present disclosure.

Figure 3B:
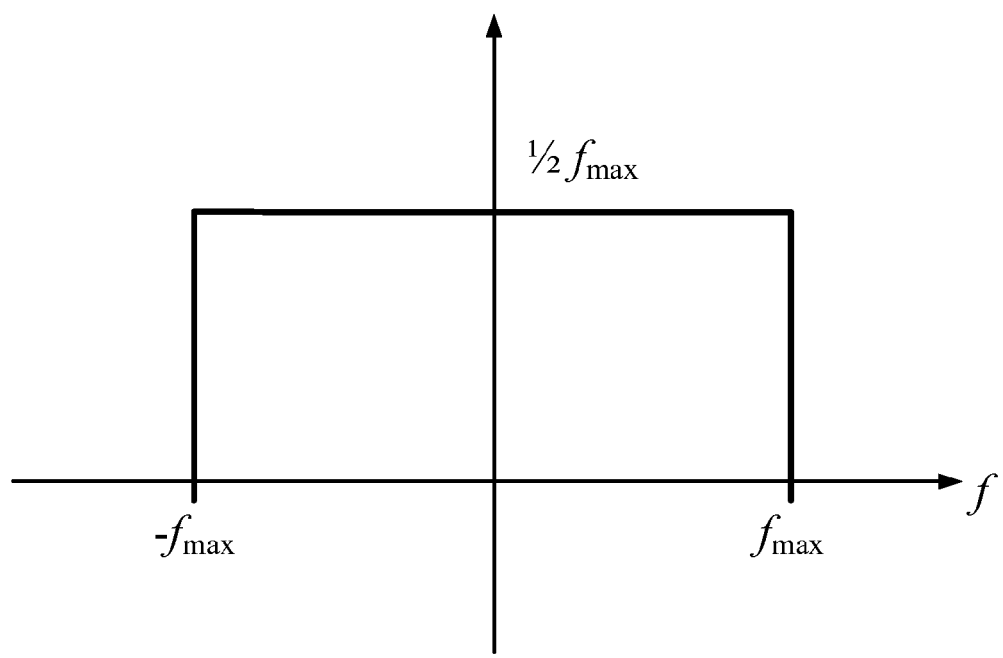
FIG. 3B illustrates an exemplary embodiment of an assumed Doppler profile of the channel that may be used in the computation of $R_{hh}$.

FIG. 3B illustrates an exemplary embodiment of an assumed Doppler profile of the channel that may be used in the computation of $R_{hh}$. In FIG. 3B, the Doppler profile of the channel is assumed to be rectangular from a frequency $-f_{max}$ to a frequency $+f_{max}$, as shown. In an exemplary embodiment, $f_{max}$ may be derived based on an assumption of speed 120 kmph at the receiver. It will be appreciated that the assumed Doppler profile in FIG. 3B is given for illustrative purposes only, and is not meant to limit the scope of the present disclosure to any particular assumed Doppler profile for the channel. In alternative exemplary embodiments, alternative values of $f_{max}$, and/or Doppler profiles having shapes other than strictly rectangular, and/or symmetric about zero frequency, may be used. Such alternative exemplary embodiments are contemplated to be within the scope of the present disclosure.

One of ordinary skill in the art will appreciate that additional factors not explicitly described hereinabove may also be accounted for in the computation of $R_{hh}$, e.g., additional correlation introduced by components in the transmit or receive circuitry, etc. Alternative exemplary embodiments accounting for such additional factors in the computation of $R_{hh}$ are contemplated to be within the scope of the present disclosure.

According to the assumptions above, values for the entries of $R_{hh}$ may be entirely computed off-line, and an eigenvector decomposition of $R_{hh}$ may be constructed therefrom as follows:

$$R_{hh}=U\Lambda U^H;  \quad\quad (Eq. 5)$$

wherein $\Lambda$ is an $N_fN_t \times N_fN_t$ diagonal matrix with the $N_fN_t$ eigenvalues of $R_{hh}$ arranged in descending order from the top-left corner to the bottom-right corner, and the eigenvector basis matrix U is the corresponding $N_fN_t \times N_fN_t$ matrix of eigenvectors. Accordingly, the channel vector h may be constructed using U as follows:

$$h=U\lambda;  \quad\quad (Eq. 6)$$

wherein $\lambda$ is defined as the $N_fN_t \times 1$ vector of eigen-coefficients of h.

According to the present disclosure, to reduce the number of eigen-coefficients required to represent the channel vector h, an $N_fN_t \times N_{dom}$ sub-matrix $U_D$ of U is formed that contains only the $N_{dom}$ "dominant" eigenvectors of U. In an exemplary embodiment, $U_D$ is denoted the dominant eigenvector matrix, and contains those eigenvectors having corresponding eigenvalues greater than a constant times the mean of all eigenvalues in $\Lambda$. Accordingly, the number $N_{dom}$ may correspond to the number of such identified dominant eigenvectors. In an exemplary embodiment, the value of the constant may be, e.g., $10^{-4}$.

One of ordinary skill in the art will appreciate that various alternative criteria may be used to identify the "dominant" eigenvectors in U, e.g., by comparing the eigenvalues in $\Lambda$ to a function of the eigenvalues other than the mean (e.g., the median), or by comparing the eigenvalues in $\Lambda$ to a constant value not dependent on the eigenvalues. Such alternative exemplary embodiments are contemplated to be within the scope of the present disclosure.

Using the dominant eigenvectors in $U_D$, an arbitrary channel vector h may be represented as follows:

$$h \approx U_D \lambda_D;  \quad\quad (Eq. 7)$$

wherein $\lambda_D$ is the $N_{dom} \times 1$ dominant eigen-coefficient vector associated with the dominant eigenvectors in $U_D$. According to the present disclosure, it is desired to derive the eigen-coefficients in $\lambda_D$ using the received pilot vector z to synthesize an estimate $\hat{h}$ of the channel vector h.

Substituting Equation 7 into Equation 3b, the received pilot vector z may be approximated using the dominant eigenvectors in $U_D$ as follows:

$$z \approx SPU_D\lambda_D + n.  \quad\quad (Eq. 8)$$

In an exemplary embodiment, a least-squares (LS) criterion may be applied to generate an estimate $\hat{\lambda}_D$ of the dominant eigen-coefficient vector $\lambda_D$ using the received pilot vector z as follows:

$$\hat{\lambda}_D = (SPU_D)^+ z;  \quad\quad (Eq. 9a)$$

$$= F^+ z.  \quad\quad (Eq. 9b)$$

wherein $(SPU_D)$ is denoted herein as a "projection" matrix, and $F^+$ denotes the pseudo-inverse of F wherein the pseudo-inverse of $F^+$ has a unique solution as $(F^H F)^{-1} F^H$ if F has full-column rank. It will be appreciated that Equation 9a corresponds to projecting the received pilot vector z onto a dominant eigenvector basis contained in the projection matrix $(SPU_D)$, with the eigen-coefficients in $\hat{\lambda}_D$ being the projections on the corresponding eigenvectors in $U_D$. As the eigenvector basis was derived based on certain assumed properties of the communications channel, one of ordinary skill in the art will appreciate that the eigenvector basis may offer a more efficient representational basis for the channel vector h than alternative bases such as, e.g., the discrete Fourier transform (harmonic) basis.

From the estimated eigen-coefficient vector $\hat{\lambda}_D$, an estimate $\hat{h}$ of the channel vector h may then be synthesized from $U_D$ as follows:

$$\hat{h} = U_D \hat{\lambda}_D.  \quad\quad (Eq. 10)$$

Finally, from the estimated channel vector $\hat{h}$, an estimated data channel vector $\hat{h}_d$ (i.e., containing the channel response for the data portion of h as opposed to the pilot portion) may be obtained as $\hat{h}_d = D\hat{h}$, wherein D is the data channel selection matrix.

In summary, the estimated data channel vector $\hat{h}_d$ may be derived from the received pilot vector z as follows:

$$\hat{h}_d = DU_D(SPU_D)^+ z; \quad \text{(Eq. 11a)}$$

$$= W_{eigen} z; \quad \text{(Eq. 11b)}$$

$$= W z; \quad \text{(Eq. 11c)}$$

wherein $W_{eigen}$ is defined as the eigenvector-based (or "eigen-based") weight matrix derived from Eq. 11, and W is defined as the generalized weighting matrix (which may or may not be eigen-based) multiplied to z to generate $\hat{h}_d$.

Figure 4:
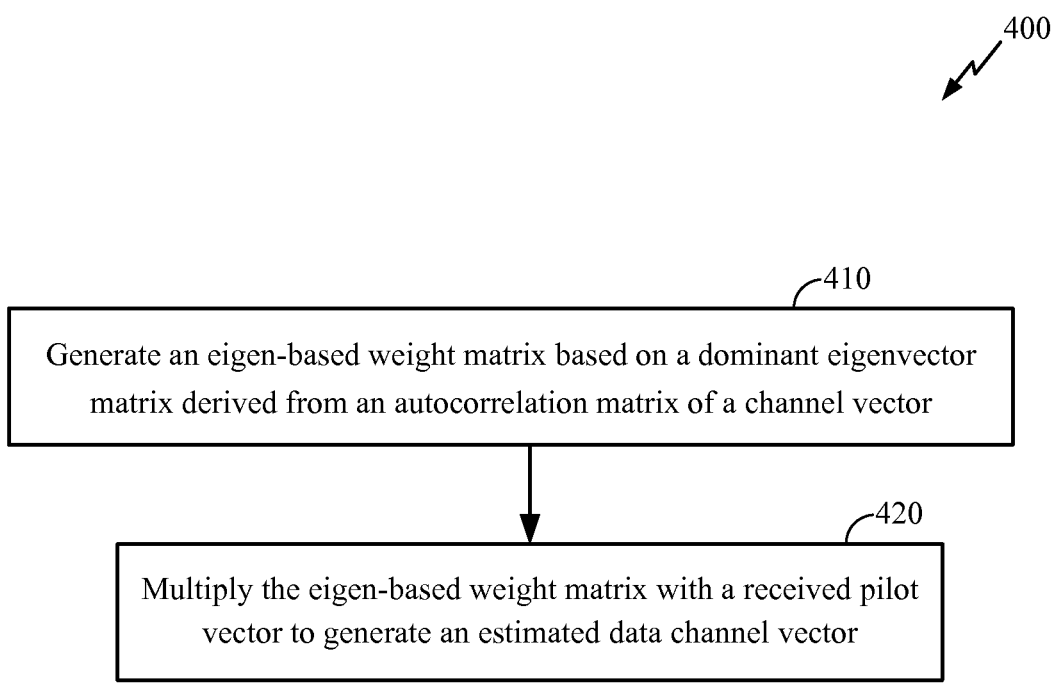
FIG. 4 illustrates an exemplary embodiment of a method for computing the estimated data channel vector $\hat{h}_D$ according to the present disclosure.

FIG. 4 illustrates an exemplary embodiment 400 of a method for estimating a channel vector for a communications channel. Note the method of FIG. 4 is provided for illustrative purposes only, and is not meant to limit the scope of the present disclosure to any particular exemplary embodiment of a method.

At block 410, an eigen-based weight matrix is generated based on a dominant eigenvector matrix derived from an autocorrelation matrix of a channel vector. In an exemplary embodiment, the weight matrix comprises the product of a data selection matrix, the dominant eigenvector matrix, and the pseudo-inverse of a projection matrix. In an exemplary embodiment, the projection matrix comprises the product of a transmit pilot matrix, a pilot selection matrix, and the dominant eigenvector matrix.

At block 420, the eigen-based weight matrix is multiplied with a received pilot vector to generate an estimated data channel vector.

In an exemplary embodiment, the eigen-based weight matrix may be derived "off-line," e.g., during a design phase of the receiver using computer simulation and/or computation software, and stored in a memory of a receiver. Subsequently, when the receiver is receiving a signal over a communications channel from a transmitter, the eigen-based weight matrix may be read from memory at block 410, and the multiplication at block 420 may be performed on received pilot vectors z.

Figure 5:
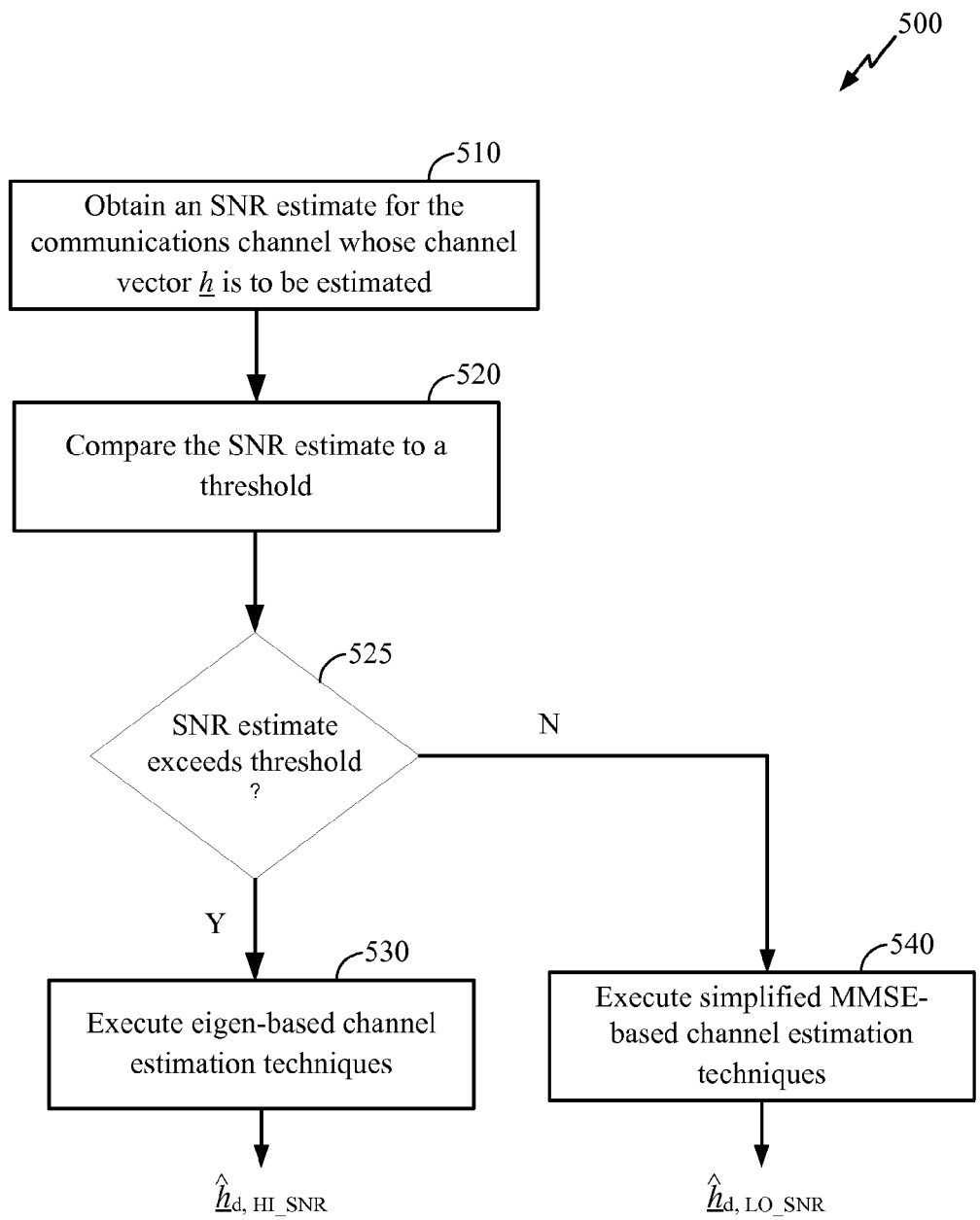
FIG. 5 illustrates an exemplary embodiment of a method wherein an eigenvector-based technique is combined with a minimum mean-square error (MMSE) technique according to the present disclosure.

In an alternative exemplary embodiment, the eigen-based channel estimation techniques described hereinabove may be further combined with other techniques to increase the accuracy of channel estimation over a wide range of expected signal-to-noise ratios (SNR's). FIG. 5 illustrates an exemplary embodiment 500 of a method wherein an eigen-based channel estimation technique is combined with a minimum mean-square error (MMSE) technique according to the present disclosure.

In FIG. 5, at block 510, an SNR estimate is obtained for the communications channel whose channel vector h is to be estimated.

At block 520, the SNR estimate is compared to a threshold.

At block 525, if the SNR estimate equals or exceeds the threshold, the method proceeds to block 530 to execute the eigen-based channel estimation techniques, e.g., as described herein with reference to FIG. 4, to generate an eigen-based estimate $\hat{h}_{d,HI\_SNR}$ of the data channel vector. If the SNR is less than the threshold, the method proceeds to block 540. In an exemplary embodiment, the threshold may be, e.g., 0 dB.

At block 540, MMSE-based channel estimation techniques may be executed to generate a channel estimate $\hat{h}_{d,LO\_SNR}$. In an exemplary embodiment, an alternative weighting matrix $W_{MMSE}$ based on MMSE-based channel estimation may be derived as follows:

$$W_{MMSE} = R_{dp}(R_{pp} + \sigma^2 I_{N_p})^{-1}; \quad \text{(Eq. 12)}$$

or a simplified weighting matrix $W_{MMSE,simp}$ as follows:

$$W_{MMSE,simp} = R_{dp}/\sigma^2; \quad \text{(Eq. 13)}$$

wherein $I_{N_p}$ is an $N_p \times N_p$ identity matrix, and $R_{dp}$ is defined as the data-pilot cross-correlation matrix $R_{dp} = E[h_d h_p^H] = E[Dh$-$h^H P^H] = DR_{hh} P^H$. Accordingly, a simplified MMSE-based estimate of the data channel vector is computed as follows:

$$\hat{h}_{d,MMSE,simp} = W_{MMSE,simp} z \quad \text{(Eq. 14a)}$$

$$= \hat{h}_{d,LO\_SNR}. \quad \text{(Eq. 14b)}$$

Note in an exemplary embodiment, dynamic estimates of the signal-to-noise ratio (SNR) of the channel may be obtained to compute the weight matrix $W_{MMSE,simp} z$ for the simplified MMSE-based channel estimation. In an alternative exemplary embodiment, at block 540, the SNR may be assumed to be a fixed value, e.g., −15 dB, to simplify the computation of $W_{MMSE,simp} z$.

In an alternative exemplary embodiment (not shown), alternative channel estimation techniques known to one of ordinary skill in the art that are suitable for low-SNR conditions may be employed at block 540, instead of the MMSE-based techniques described. Such alternative exemplary embodiments are contemplated to be within the scope of the present disclosure.

It will be appreciated that the specific dimensions (e.g., $N_t$ and $N_f$) of the assignment block used for the computations described hereinabove may be appropriately chosen based on the receiver design. For example, a smaller assignment block may be adopted to simplify the computations involved. Note that while an assignment block is illustrated in FIG. 2 as including contiguous OFDM symbols and sub-carriers, it will be appreciated that the symbols and sub-carriers of an assignment block need not be contiguous. The techniques of the present disclosure may readily be applied to assignment blocks having arbitrary size and shape.

One of ordinary skill in the art will appreciate that the techniques may readily be adapted to accommodate systems employing more than one transmit and/or receive antenna, e.g., a multiple-input multiple-output (MIMO) system. For example, an OFDM system employing K transmit antennas and M receive antennas may be accommodated according to the techniques of the present disclosure, wherein the K transmit antennas can simultaneously transmit data symbols corresponding to K spatial layers at each data symbol position, while each of the K transmit antennas may transmit pilot symbols at predetermined pilot positions. The techniques disclosed herein may be employed, e.g., to estimate the channel vector from any transmit antenna to any receive antenna, based on the pilot signals known to be transmitted from the specified transmit antenna. Such alternative exemplary embodiments are contemplated to be within the scope of the present disclosure.

The techniques disclosed herein may also be employed to estimate a single channel vector $\hat{h}$ from a plurality of transmit antennas to a plurality of receive antennas. For example, to obtain a matrix U containing the channel eigenvectors for a MIMO system, the eigenvector decomposition of Equation 5 may be performed on the autocorrelation matrix $R_{hh}$ of a composite channel vector $h_{MIMO}$, wherein $h_{MIMO}$ stacks the channel vector h from each of the plurality of transmit-receive antenna pairs into a single column vector. It will be appreciated that the autocorrelation matrix $R_{h_{MIMO} h_{MIMO}}$ of such a vector may then account for the spatial correlation between symbols transmitted from and/or received at different antennas. Such alternative exemplary embodiments are contemplated to be within the scope of the present disclosure.

Figure 6:
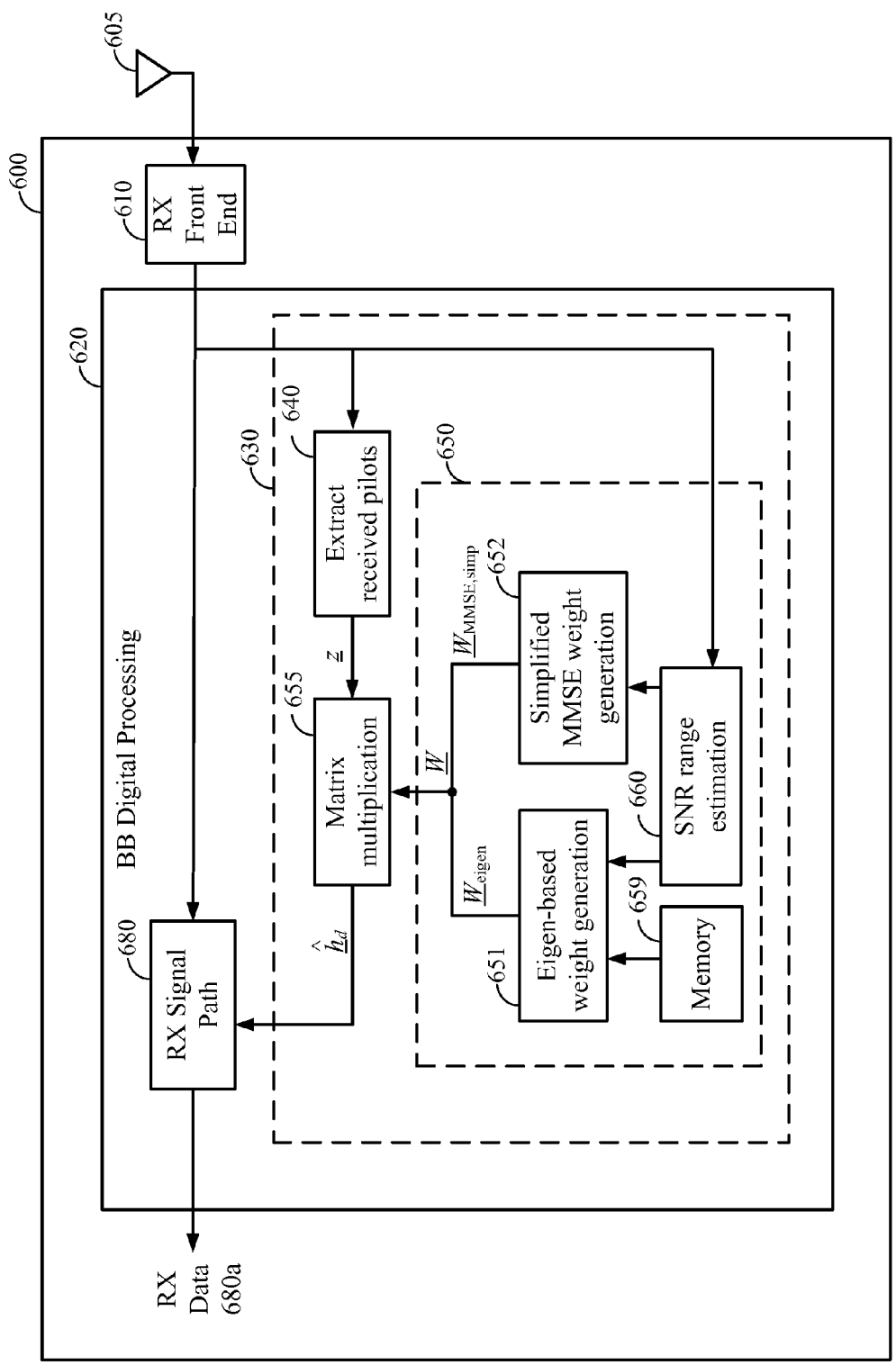
FIG. 6 illustrates an exemplary embodiment of a receiver according to the present disclosure.

FIG. 6 illustrates an exemplary embodiment of a receiver 600 according to the present disclosure. Note the receiver 600 is shown for illustrative purposes only, and is not meant to limit the scope of the present disclosure. One of ordinary skill in the art will appreciate that the receiver 600 may be implemented in any communications receiver, e.g., a receiver for base stations such as 160A to 160G in FIG. 1, or for access terminals such as 106A to 106G in FIG. 1. Such exemplary embodiments are contemplated to be within the scope of the present disclosure.

In FIG. 6, the receiver 600 includes an antenna 605 coupled to a receive (RX) front end 610. The RX front end 610 may include, e.g., circuitry for converting a radio-frequency (RF) signal to a baseband digital signal for further processing. The baseband signal is coupled to a baseband (BB) digital processing module 620, which includes an RX signal path 680 for digitally processing the baseband digital signal. The RX signal path 680 may perform such digital operations as equalization, decoding, etc., any of which may require an estimated data channel vector $\hat{h}_d$ as computed, e.g., according to the techniques of the present disclosure. The RX signal path 680 outputs RX data 680a for further processing, e.g., by a microprocessor (not shown).

In FIG. 6, the BB digital processing module 620 contains a channel estimation block 630 for estimating the data channel vector $\hat{h}_d$. The block 630 includes a module 640 for extracting a received pilot vector z from the received signal, a weight generation module 650 for generating a weight matrix W, and a module 655 for multiplying the received pilot vector z with the weight matrix W to generate the estimated data channel vector $\hat{h}_d$.

In the exemplary embodiment shown, the module 650 includes an eigen-based weight matrix generator 651, a simplified MMSE weight matrix generator 652, and an SNR range estimation module 660. According to the principles of the present disclosure, the SNR range estimation module 660 estimates an SNR range of the received signal, and accordingly selects one of the weight matrix generators 651 or 652 to generate W. In an exemplary embodiment, the SNR range estimation module 660 may select the weight matrix generator 651 to generate an eigen-based weight matrix $W_{eigen}$ when the estimated SNR is above a threshold, and select the weight matrix generator 652 to generate an MMSE-based weight matrix $W_{MMSE,simp}$ when the estimated SNR is below the threshold. One of ordinary skill in the art will appreciate that various techniques are available for estimating the SNR of a received signal, and the techniques of the present disclosure are not restricted to any particular techniques for estimating SNR.

In an exemplary embodiment, as earlier described, the projection matrix, including the dominant eigenvector matrix $U_D$ for generating the eigen-based weight matrix, may be stored in a memory 659, and retrieved for processing when received pilot vectors z are available for each received assignment block.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. A method for estimating a channel vector for a communications channel, the method comprising:
    generating an eigen-based weight matrix based on a dominant eigenvector matrix derived from an autocorrelation matrix of the channel vector, the weight matrix comprising the product of a data selection matrix, the dominant eigenvector matrix, and the pseudo-inverse of a projection matrix, the projection matrix comprising the product of a transmit pilot matrix, a pilot selection matrix, and the dominant eigenvector matrix; and
    multiplying the eigen-based weight matrix with a received pilot vector to generate an estimated data channel vector, the step of multiplying being performed while receiving a signal over the communications channel from a transmitter.

2. The method of claim 1, the generating the eigen-based weight matrix comprising retrieving the eigen-based weight matrix from a memory, the eigen-based weight matrix in the memory being computed off-line.

3. The method of claim 1, the dominant eigenvector matrix comprising dominant eigenvectors selected from the eigenvectors of the autocorrelation matrix, the dominant eigenvectors determined as those having corresponding eigenvalues greater than a constant times the mean of all eigenvalues.

4. The method of claim 1, further comprising:
    estimating a signal-to-noise ratio (SNR) of the communications channel;
    only performing the step of multiplying the eigen-based weight matrix with a received pilot vector if the SNR estimate is above a threshold.

5. The method of claim 4, further comprising, if the SNR estimate is below the threshold:
    generating a simplified MMSE-based weight matrix, the weight matrix comprising the result of a data-pilot cross-correlation matrix divided by a noise estimate; and
    multiplying the simplified MMSE-based weight matrix with the received pilot vector to generate the estimated data channel vector.

6. The method of claim 5, the generating the simplified MMSE-based weight matrix comprising using a fixed SNR estimate.

7. The method of claim 5, the generating the simplified MMSE-based weight matrix comprising retrieving the simplified MMSE-based weight matrix from a memory.

8. An apparatus for estimating a channel vector for a communications channel, the apparatus comprising:
    a processor, the processor further comprising:
        a weight generation module configured to generate an eigen-based weight matrix, the weight matrix comprising the product of a data selection matrix, an eigenvector basis matrix, and the pseudo-inverse of a projection matrix, the projection matrix comprising the product of a pilot selection matrix and the eigenvector basis matrix, the eigenvector basis matrix comprising the dominant eigenvectors of an autocorrelation matrix of the channel vector; and
        a module configured to multiply the output of the weight generation module with a received signal vector to generate an estimated data channel vector.

9. The apparatus of claim 8, the received signal vector being a received pilot vector.

10. The apparatus of claim 8, the dominant eigenvectors comprising eigenvectors having corresponding eigenvalues greater than a threshold.

11. The apparatus of claim 8, further comprising a memory storing the eigen-based weight matrix, the weight generation module configured to generate the eigen-based weight matrix by reading the matrix from the memory.

12. The apparatus of claim 8, the weight generation module further configured to generate a simplified minimum mean-square error (MMSE)-based weight matrix, the apparatus further comprising:
    an SNR range estimation module configured to select the simplified MMSE-based weight matrix as the output of the weight generation matrix when the SNR is below a threshold, and to select the eigen-based weight matrix as the output of the weight generation matrix when the SNR is above the threshold.

13. A non-transitory computer-readable medium storing code for causing a computer to estimate a channel vector for a communications channel, the code comprising:
    code for causing a computer to generate an eigen-based weight matrix based on a dominant eigenvector matrix derived from an autocorrelation matrix of a channel vector, the weight matrix comprising the product of a data selection matrix, the dominant eigenvector matrix, and the pseudo-inverse of a projection matrix, the projection matrix comprising the product of a transmit pilot matrix, a pilot selection matrix, and the dominant eigenvector matrix;
    code for causing a computer to multiply the eigen-based weight matrix with a received pilot vector to generate an estimated data channel vector.

14. The non-transitory computer-readable medium of claim 13, the code for causing a computer to generate the eigen-based weight matrix comprising:
    code for causing a computer to retrieve the eigen-based weight matrix from a memory, the eigen-based weight matrix stored in memory being computed off-line.

15. The non-transitory computer-readable medium of claim 13, the code for causing a computer to multiply comprising code for causing a computer to multiply while receiving a signal over the communications channel from a transmitter.

16. The non-transitory computer-readable medium of claim 13, the dominant eigenvector matrix comprising dominant eigenvectors selected from the eigenvectors of the autocorrelation matrix, the dominant eigenvectors determined as those having corresponding eigenvalues greater than a constant times the mean of all eigenvalues.

17. The non-transitory computer-readable medium of claim 13, the code further comprising:
    code for causing a computer to estimate a signal-to-noise ratio (SNR) of the communications channel; and
    code for causing a computer to only perform the step of multiplying the eigen-based weight matrix with a received pilot vector if the SNR estimate is above a threshold.

18. The non-transitory computer-readable medium of claim 17, the code further comprising:
  code for causing a computer to, if the SNR estimate is below the threshold, generate a simplified MMSE-based weight matrix, the weight matrix comprising the result of a data-pilot cross-correlation matrix divided by a noise estimate; and
  code for causing a computer to multiply the simplified MMSE-based weight matrix with the received pilot vector to generate the estimated data channel vector.

* * * * *